United States Patent Office 3,534,254
Patented Oct. 13, 1970

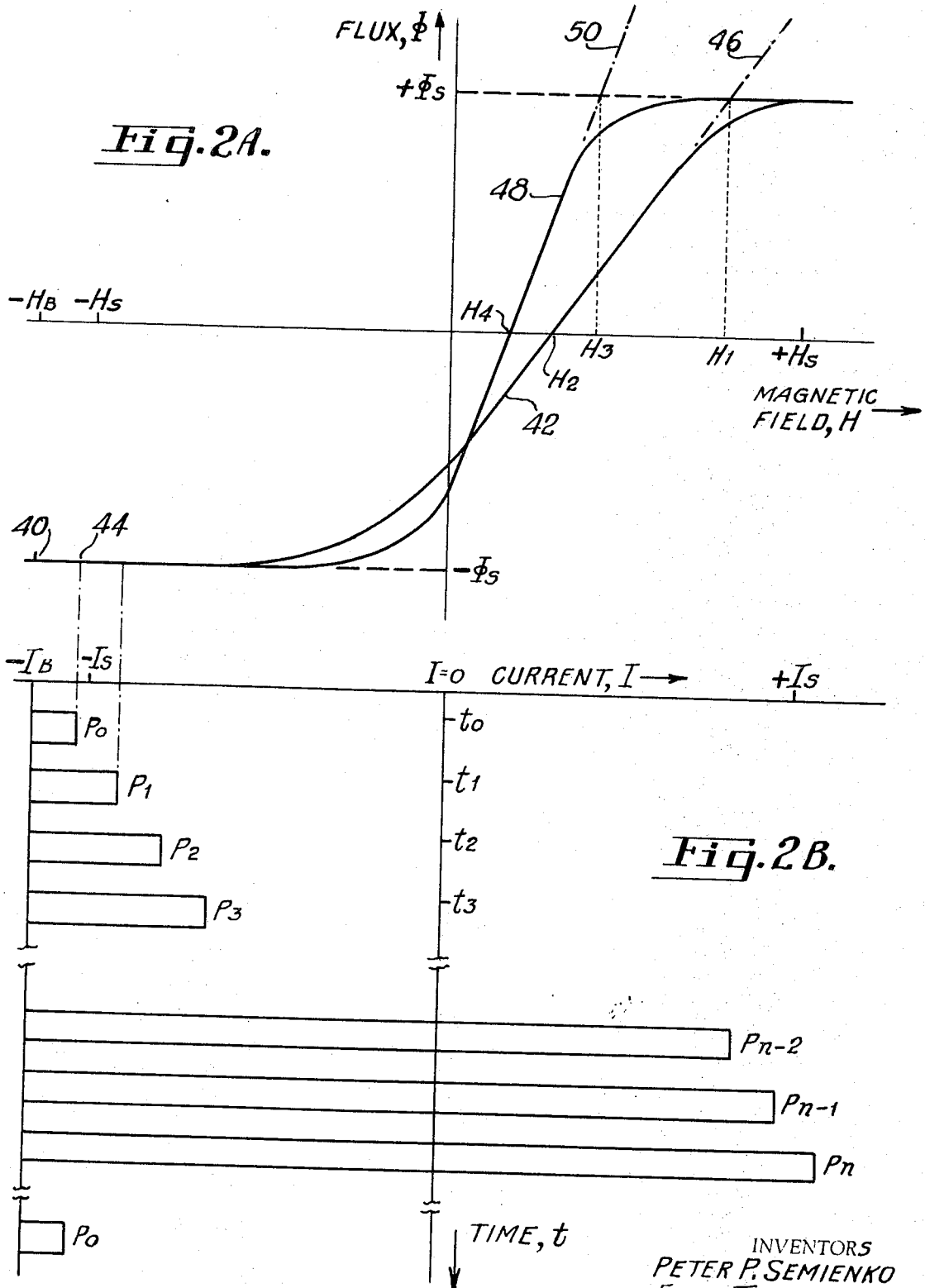

3,534,254
METHOD FOR MEASURING THE MAGNETO-ELASTIC COEFFICIENT AND DIFFERENCE IN ANISOTROPY FIELD IN FERROMAGNETIC MATERIAL
Peter P. Semienko, Roslindale, and Emil Toledo, Natick, Mass., assignors to Honeywell Inc., Minneapolis, Minn., a corporation of Delaware
Filed Apr. 16, 1968, Ser. No. 721,740
Int. Cl. G01r 33/12
U.S. Cl. 324—34      5 Claims

ABSTRACT OF THE DISCLOSURE

Subjecting anisotropic ferromagnetic material to a pulsed magnetic field directed along the hard axis of magnetization and having a quiescent magnitude that saturates the material in a first direction and having different pulse magnitudes ranging from the quiescent value to a value that saturates the material in the opposite direction provides the basis for accurate measurement of the magnetization characteristic of the material. Comparison of these characteristics when the material is subjected to different axial stresses accurately determines the magnetoelastic coefficient of the material.

BACKGROUND OF THE INVENTION

This invention relates to a method and apparatus for measuring magnetic properties of ferromagnetic materials. It provides an accurate and simple determination of the magnetic hysteresis of the material, and also of its magnetoelastic coefficient, that is, of the change in the anistrophy field, $H_K$, of the material when subjected to stress. One particular application of the invention is in providing information for controlling the manufacture of magnetically plated wires for magnetic memories, for there it is generally desired that the magnetic property of the plated wire have low sensitivity to stress.

It is known that the relative amounts of nickel and iron in ferromagnetic materials are directly related to the magnetoelastic coefficient of the material. See, for example, Bozorth, "Ferromagnetism," fourth printing, D. Van Nostrand Co. Inc., chapter XIII. Further, apparatus is known for subjecting magnetic materials to torsional stress and relating the measured magnetic properties to the nickel-iron content of the film. See, T. R. Long, "Magnetoelastic Sensitivity and Composition of Permalloy Films," 37 J. Appl. Phys. 3, 1470–1471 (1966).

However, obtaining accurate information with such prior apparatus is time consuming; for the prior apparatus requires careful setup and careful operation to restrict measuring errors.

Accordingly, it is an object of this invention to provide an improved method and apparatus for measuring magnetic properties of materials.

It is also an object to provide an improved method and apparatus for determining changes in the magnetic properties of a material due to stress in the material.

A further object of the invention is to provide an improved method and apparatus for determining the magnetoelastic coefficient of a ferromagnetic material, particularly of a material that is magnetically anisotropic.

It is also an object to provide a method of the above character that is accurate and that can be executed in a short time.

Another object of the invention is to provide measuring apparatus of the above character that is relatively easy to assemble and to operate. In addition, the apparatus should introduce minimal errors to the measurement.

Other objects of the invention will in part be obvious and will in part appear hereinafter.

The invention accordingly comprises the several steps and the relation of one or more of such steps with respect to each of the others, and the apparatus embodying the features of construction, combination of elements and arrangement of parts adapted to effect such steps, all as exemplified in the following detailed disclosure, and the scope of the invention is indicated in the claims.

SUMMARY OF THE INVENTION

The invention attains the foregoing objects by providing a method and apparatus for use in rapidly determining, with high accuracy, the magnetic flux, and hence magnetization, of a material as a function of an applied magnetic field. The measurement is accurately made both when the material is subjected to no external tensile stress and when it is subjected to a measurable external tensile stress.

The invention further provides an accurate determination of the differences in the magnetic properties of the material between the stressed and unstressed conditions. From this information, the magnetoelastic coefficient and the nickel-iron proportions of the material are readily determined, again with high accuracy.

In accordance with the invention, the magnetization of an anisotropic ferromagnetic material is determined by subjecting the material to a pulsating magnetic field directed along the hard axis of magnetization of the material. The field can be considered as the resultant of two applied fields, and is conveniently developed as such. One field component has constant magnitude to bias the magnetic flux to saturation in one hard-axis direction. The second field component is applied in pulses and directed in the opposite hard-axis direction. Different pulses have different magnitudes ranging from essentially zero to the level where the pulse field overcomes the bias component and saturates the flux in the other hard-axis direction. Thus the material is subjected to a resultant pulsating hard-axis magnetic field that incrementally changes from saturation in one direction to saturation in the opposite direction and drops to saturation in the first direction intermediate the pulses.

When this field switches, the magnetization of the magnetic material changes between the saturation condition developed by the bias field alone and a condition corresponding to the pulse field. A display of a signal proportional to this change in magnetization as a function of the magnitude of the pulse field provides the desired display of the magnetization of the material.

When this measurement is performed twice on the same material sample when the sample has two different tensile stresses, one of which can be zero, directed along the hard axis, the difference in anisotropy field for the two conditions divided by the strain which the change in stress produces in the sample, identifies the magnetoelastic coefficient of the sample. The measurement can be performed in a matter of minutes, or even seconds, and is highly accurate.

The apparatus for practicing the invention includes a fixture for supporting the magnetic sample being examined, an arrangement of one or more drive coils to apply the magnetic field, and a sense coil to detect the resultant changes in magnetization in the sample. An electrical source for developing the pulsating field is connected with the drive coil arrangement, and detecting circuitry including an integrator is connected with the sense coil. Recording equipment develops the display of magnetization information and records it as desired.

BRIEF DESCRIPTION OF FIGURES

For a fuller understanding of the nature and objects of the invention, reference should be had to the following detailed descritpion taken in connection with the accompanying drawings, in which:

FIG. 2A is a graph of magnetization properties of a material as determined with the invention; and FIG. 2B is a graph illustrating the operation of the FIG. 1 instrument in providing the information depicted in FIG. 2A.

DESCRIPTION OF PREFERRED EMBODIMENT

Figure 1:
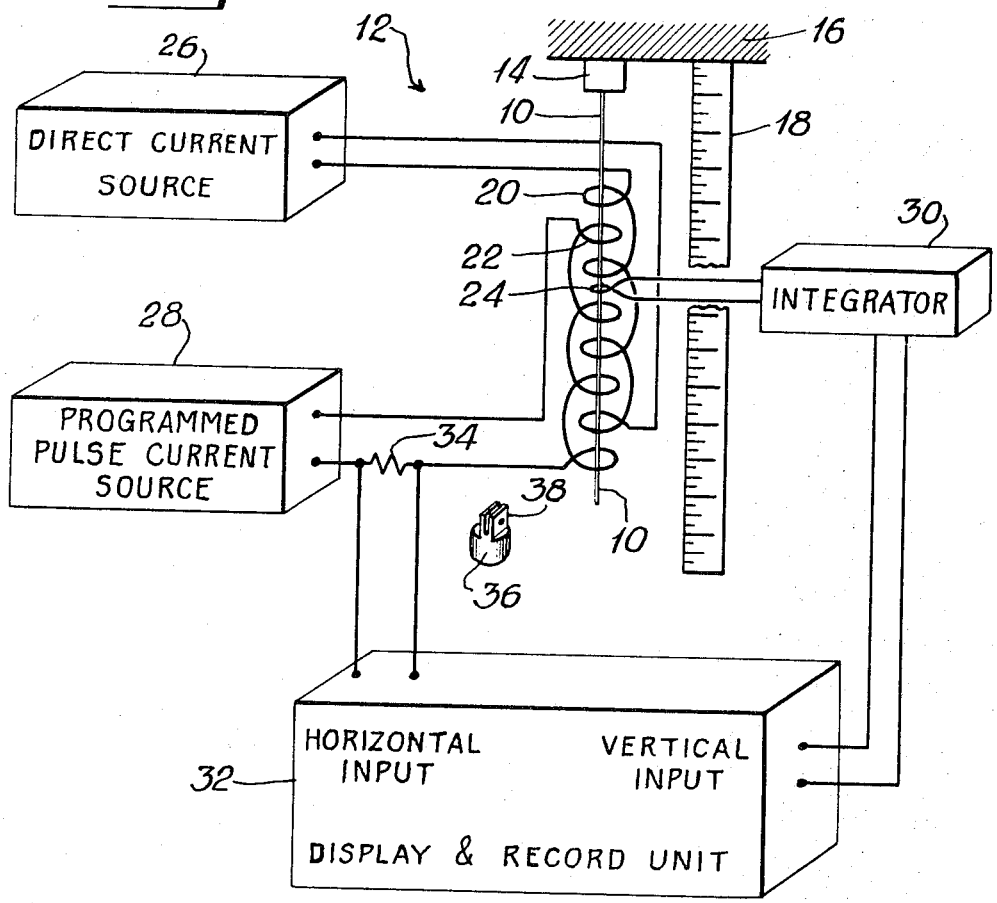
FIG. 1 is a schematic representation, partly in block form, of an instrument for practicing the invention.

FIG. 1 shows an instrument embodying the invention for measuring the magnetization characteristics of an elongated magnetic sample 10, illustrated as a cylindrical magnetic film deposited on a conductive wire. The magnetic film is anisotropic, having an axial hard axis of magnetization and a circumferential easy axis of magnetization. The instrument includes a test fixture indicated generally at 12 having a clamp 14 from which the sample 10 is suspended. The clamp 14 is mounted on a support 16. A scale 18 provided to measure the length of the suspended sample 10 can also be mounted to the support 16.

The fixture 12 has two drive coils 20 and 22 arranged to produce overlapping magnetic fields that are relatively uniform and parallel to the suspended sample. The illustrated preferred drive coils are coaxial and coextensive and bifilar wound with a length several times their diameters. Further, the sample 10 is suspended along the common axis of these coils.

A sense coil 24 surrounds the sample 10 inside the drive coils 20 and 22 to sense the vector change in magnetic flux in the sample. Hence the sense coil is parallel to, and preferably coaxial with, the drive coils. Further, the illustrated sense coil is shorter than the drive coils and lies along their central portions where the drive fields are relatively uniform and free of stray components.

A direct current source 26 is connected to the drive coil 20. It is adjusted to develop a current that develops an axial magnetic field sufficient to saturate the magnetic flux in the sample 10.

In addition, a programmed pulse current source 28 is connected to the drive coil 22; the source is preferably arranged so that the frequency, duty cycle, and amplitude characteristics of the pulses output from it can be adjusted. Further, it automatically changes the amplitude of the pulses with time. Specifically, the source 28 develops repetitive trains of pulses with the pulses in each train having different magnitudes between zero and a selected magnitude described below. Usually the pulse magnitudes increase successively by equal increments to the maximum value.

The instrument of FIG. 1 also has an electrical integrator 30 connected to receive the voltage induced between the ends of the sense coil 24 by changes in the magnetic flux linking it. The integrator applies the time integral of this voltage to the vertical deflection input of a display and record unit 32. This unit, which by way of example is a cathode ray oscilloscope fitted with a camera, provides a rectangular-coordinate display of the voltage it receives at the vertical input as a function of the magnetic field to which the sample 10 is subjected. To provide the signal required for such a horizontal deflection, the voltage the current pulses from the programmed source 28 develop across a small series resistor 34 is applied to the horizontal deflection input of the unit 32. As mentioned, the display and record unit includes a camera or like recording device capable of providing at least a short term record of the information display.

In particular, the unit 32 displays the voltage it receives from the integrator when triggered by the trailing edge of the pulse voltage across resistor 34. The horizontal coordinate of the vertical deflection is proportional to the magnitude of the terminated pulse voltage. Alternatively, the display can be triggered with the pulse leading edge, but this is considered less desirable then the trailing edge.

The measuring instrument of FIG. 1 also includes a weight 36 having a clamp 38 or like removable connection to secure it to the free end of the suspended sample 10 under test for the purpose of subjecting the sample to a known axial stress. The elongation of the sample 10 due to this tensile stress is measured with the scale 18, which should be considered illustrative of more precise lineal measuring devices.

The operation of the instrument shown in FIG. 1 and the method for practicing the invention will now be further described with reference to FIGS. 1 and 2. FIG. 2A is a rectangular-coordinate display of the magnetic flux, $\Phi$, in the sample 10 as a function of the resultant magnetic field, H, applied to the sample by the two drive coils 20 and 22. The flux, plotted along the ordinate, is measured by means of the sense coil 24. For absolute measurements of the magnetization characteristics as shown in FIG. 2A, both the abscissa and the ordinate are calibrated. However, for measurements of magnetoelastic coefficient as described below, only the calibration along the abscissa is utilized.

Direct current from the FIG. 1 source 26 develops in the coil 20 an axial magnetic field, i.e. along the axis of the elongated sample 10, in it will be assumed, the downward direction with reference to FIG. 1. The source is adjusted to deliver a value of current, $(-I_B)$, that develops this magnetic field with a value $(-H_B)$ that saturates the magnetic flux in the cylindrical film on the plated wire sample 10. (Of course a larger current, developing a field in excess of $-H_B$, can be used.)

This condition is shown in FIG. 2B, which is a graph of the current applied to the drive coils as a function of time. At the time $(t_0)$ only the current $(-I_B)$ is present.

With this current in drive coil 20 and no current in drive coil 22, the magnetization of the sample 10 is depicted in FIG. 2A with the point 40 on curve 42. That is, the sample 10 is subjected to a field of magnitude $H_B$ directed in the downward direction, assumed to be the minus direction. The resultant flux in the sample is saturated, i.e. has a value $(-\Phi_s)$.

The programmed source 28 is now activated. It repetitively produces a train of current pulses of successively larger magnitudes. The first pulse in each sequence has a near-zero magnitude and the last pulse has a magnitude that causes the drive coil 22 to produce an upward-directed field $(+H_B)$ that saturates the magnetic flux in the upward direction, i.e. develops the flux $(+\Phi_s)$ in the sample 10. The largest pulse hence produces a field equal to the sum of the absolute values of $(-H_B)$ and $(+H_B)$. For coils 20 and 22 that produce equal fields with equal currents, which is the condition illustrated in FIG. 2B, the largest current pulse has a magnitude equal at least to the sum of the absolute values of $(-I_B)$ and $(+I_B)$.

FIG. 2B also illustrates, in a simplified manner, the values of the pulse currents thus applied to the drive coil 22. The pulses are designated, starting with the initial smallest pulse produced at time $(t_1)$, as $P_0$, $P_1$, $P_2$ etc., and the final largest pulse in the train is $P_n$.

Each pulse from the programmed source 28 is of sufficient duration to allow all magnetic phenomena bearing on the sample 10 to settle stable values, e.g. for switching transients in the coils and domain switching within the sample 10 to settle to final steady-state, values. Similarly, the duration between successive pulses is also sufficient for the magnetic phenomena to settle to stable conditions responsive to the field $(-H_B)$, which is the only field present during these no-pulse intervals.

The resultant magnetic field applied to the sample 10 has the value $(-H_B)$ between pulses and hence saturates the sample with the flux $(-\Phi_s)$. Each pulse switches the resultant field from this bias value to a value closer to $(+H_B)$, with the largest pulses driving the field at least to $(+H_B)$. In response to the transition in applied field thus produced at both the leading and trailing edges of each pulse, the magnetic flux in the material switches respectively from and to the $(-\Phi_S)$ value. Accordingly, the flux linking the sense coil 24 changes, and a voltage responsive to the flux change is induced in the coil.

The integrator 30 applies the time integral of this voltage, which voltage is proportional to the total flux changes produced by the switching field, to the vertical deflection input of the display and record unit 32. In the illustrated instruments, only the voltage the unit 32 receives from the integrator in response to the switching off of each pulse, is displayed. This operation is readily obtained by triggering the display operation of the unit 32 with the trailing edge of each current pulse applied to the drive coil 22.

Hence, as indicated in FIGS. 2A and 2B, when the pulse $P_0$ terminates, the unit 32 displays the point 44 on the curve 42. The abscissa of this point 44 corresponds to the net field resulting from the bias current and the pulse current $P_{0'}$. The ordinate of the point identifies the magnetic flux in the sample 10 with this value of the net field. That is, the difference in ordinate values between the points 40 and 44 identifies the change in flux in the sample 10 resulting from decreasing the net field from $(-H_B)$ to the resultant value when pulse $P_0$ is present.

Similarly, as the programmed current souce 28 applies successive pulses to the coils 22, the display and record unit 32 displays successive points along the curve 42 corresponding to the changes in the magnetization conditions of the sample 10 due to these pulses. The curve 42 is thus a smooth trace through the individual points recorded with the individual current pulses. Such a curve is often referred to as a major, hard axis, hysteresis curve of the magnetic properties of the sample 10. The unit 32 records the display, suitably photographically.

A somewhat similar instrument for use in measuring and displaying the magnetization characteristics of magnetic cores such are used in core memories and having a direct current source, a programmed pulse current source and a display and recording unit, which sources and unit are suited for use in the instrument of FIG. 1, is described by R. Lukianov and P. Semienko, in the Proceedings of the 1964 Intermag Conference, Stockholm, Sweden. Moreover, alternative to the illustrated instrument, a single current source can combine the functions of the two illustrated sources. In this case, only a single drive coil is needed. Further, the order in which the current pulses change in value is not significant.

In this manner, the invention provides an accurate measure and graphic display of the magnetic characteristics of the sample 10. The data is accurate and is obtained rapidly and with operator ease.

In addition to depicting the magnetization characteristics of the sample 10, the curve 42 also provides the anisotropy field $H_K^U$ (superscript U indicates unstressed condition) of the sample. Specifically, the anisotropy field is the sum of two field values obtained from curve 42. The first value is the abscissa, designated $H_1$ in FIG. 2A, where the line 46, which is tangent to the curve 42 where it crosses the abscissa axis, intersects the $(+\Phi_S)$ ordinate. The second field value, designated $H_2$, is the loss field and is the abscissa where the curve 42 crosses the abscissa axis. The resultant field value is the anisotropy field of the sample 10.

Throughout the measurements made according to the foregoing discussion, the sample 10 has been unstressed, i.e. it was merely suspended from clamp 14. Further data for determining the magnetoelastic coefficient of the sample is obtained with the weight 36 hung on the sample. With the sample thus axially stressed, the resultant strain $\epsilon$, i.e. increase in sample length divided by unstressed sample length, is measured using the scale 18.

In addition, the operation of the FIG. 1 equipment described above to produce the curve 42 is repeated with the stressed sample, producing a second curve 48.

As illustrated, the curve 48 for the stressed sample is generally different from the unstressed magnetization curve 42, but has the same values of saturation flux $(-\Phi_S)$ and $(+\Phi_S)$. This means that the magnetic field required to change the magnetization, and hence the magnetic flux, of the material under study is dependent on the tensile stress in the material. The sign and magnitude of this dependence is expressed as the magnetostriction of the material. The reason for this dependence of magnetization on stress involves considerations of the magnetic strain energy of the material and the relation between the energy in the material and the applied field.

The anisotropy field $H_K^S$ for the stressed sample is obtained in the same manner as for the unstressed sample, i.e. as the sum of the field values $H_3$ and $H_4$, where the loss field $H_4$ is the abscissa where the curve 48 crosses the zero point on the ordinate scale and where $H_3$ is the abscissa where the line 50, tangent to the curve 46 where it crosses the ordinate, intersects the $(+\Phi_S)$ ordinate.

Having thus determined the unstressed and stressed anisotropy fields $H_K^U$ and $H_K^S$, respectively, of the sample 10 in accordance with the invention, the magnetoelastic coefficient, $\eta$, of the sample is determined in a known manner. Specifically $$\eta = \frac{H_K^U - H_K^S}{\epsilon}$$

where $\eta$ is the strain as determined above.

The invention thus further provides a rapid, facile and accurate determination of the magnetoelastic coefficient of magnetic materials, in particular of anisotropic magnetic materials having a hard axis of magnetization along which the material can be stressed. It is significant that the measurement is free of torsional stresses, which are difficult to apply with accuracy. Instead, the invention is practiced with two different tensile stresses; one of which can be zero (by having no external stress) as illustrated. Alternatively, the invention can be practiced with two different non-zero tensile stresses to provide an equally accurate measure of magnetoelastic coefficient.

It is further significant that the measurements of magnetization are made by switching the material under study repetitively between one saturation condition and a range of non-saturation conditions as well as the other saturation condition. Further, the material is held in each condition, before again switching it, for sufficient time for its magnetic properties to attain substantially a steady-state posture.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

A further feature of the invention is that it provides, with operator ease, an accurate measure of saturation flux. For a given composition of the magnetic material, the magnitude of saturation flux is directly related to the volume of magnetic material per unit length. Hence, for a magnetic film plated on a wire of uniform diameter, the present measure of saturation flux provides a ready but accurate measure of film thickness.

It should further be noted that the shape of the FIG. 2A curve 42 for an unstressed sample reveals additional useful information regarding the sample.

Having described the invention, what is claimed as new and secured by Letters Patent is:

1. A method for measuring properties of ferromagnetic material having first and second regions spaced apart along a first axis, said method comprising steps of
   (A) subjecting said material to a pulsating magnetic field directed along said axis, said field including a succession of time-spaced pulses each of substantially uniform magnitude with different pulses having different magnitudes ranging from a first valve that saturates said material in a first direction along said axis to a value that saturates said material in the opposite direction along said axis, said pulsating field further having a value as small as at least said first value intermediate said pulses,
   (B) sensing the changes in magnetic flux in said material resulting from transitions of said field between the saturation value corresponding to said first field value and the values during said pulses,
   (C) manifesting an output indication corresponding to said sensed changes in flux,
   (D) subjecting said material to a tensile stress,
   (E) repeating said subjecting, sensing, and manifesting steps with said material under said tensile stress,
   (F) determining from said manifestations the difference in the anisotropy field and said material between its stressed and unstressed states.

2. A method as defined in claim 1 in which said manifesting step includes the steps of displaying a time integral of an electrical signal responsive to said sensed changes in flux as a function of the magnitudes of said pulse field supplied to said material.

3. A method as defined in claim 1 in which said field-subjecting step includes the further steps of
   (A) subjecting said material to a constant first magnetic field directed parallel to said axis and of a magnitude that saturates said material in a first direction, and
   (B) subjecting said material simultaneously to a second pulsating magnetic field superimposed on said first field, said pulsating field including a time-spaced succession of pulses each of substantially uniform magnitude with different pulses having different magnitudes ranging from near zero to the sum of the absolute values of said first field and the saturation field of said material in the direction opposite to said first direction, said pulsating field further having a value as small as at least substantially zero intermediate said pulses.

4. A method of measuring the magnetoelastic coefficient of an anisotropic material elongated along a first axis and having a hard axis of magnetization longitudinal to said axis, said method comprising the steps of
   (A) subjecting said material to a first tensile stress,
   (B) subjecting said material as thus stressed to a pulsating magnetic field parallel to said axis, said field including a time-spaced succession of pulses with different pulses having different magnitudes ranging from a first value that saturates the magnetization of said material in a first direction along said axis to a second value that saturates the magnetization of said material in the opposite direction along said axis, said pulsating field having a value removed from said second value to at least said first value intermediate said pulses,
   (C) sensing the change in magnetic flux produced by the changes in said magnetic field between the value intermediate said pulses and the value during said pulses,
   (D) developing an electrical voltage corresponding to the time integral of said change in flux,
   (E) manifesting said voltage as a function of the magnitude of said pulse field,
   (F) subjecting said material to a second tensile stress,
   (G) repeating said subjecting, sensing, developing and manifesting steps with said material under said second tensile stress,
   (H) determining the strain in said material corresponding to the change in the tensile stress therein between said first and second values,
   (I) determining, from said manifestations, the difference in the anisotropy field of said material when the tensile stress in said material changes from said first to said second value, and
   (J) determining said coefficient as the quotient of said difference in anisotropy field divided by said strain.

5. A method as defined in claim 4 further characterized in that said pulsating magnetic field maintains each value thereof for a time sufficient to allow magnetic conditions in said material to attain substantially steady-state values.

References Cited

UNITED STATES PATENTS

| | | | |
|---|---|---|---|
| 2,841,763 | 7/1958 | Stuart-Williams et al. | 324—40 |
| 2,934,696 | 4/1960 | Williams et al. | 324—40 |

FOREIGN PATENTS

| | | |
|---|---|---|
| 442,441 | 2/1936 | Great Britain. |

RUDOLPH V. ROLINEC, Primary Examiner

R. J. CORCORAN, Assistant Examiner

UNITED STATES PATENT OFFICE
CERTIFICATE OF CORRECTION

Patent No. 3,534,254        Dated October 13, 1970

Inventor(s) Peter P. Semienko et al.

It is certified that error appears in the above-identified patent and that said Letters Patent are hereby corrected as shown below:

Column 7, line 13, "valve" should read -- value --; line 29, "and" should read -- of --.

Signed and sealed this 30th day of November 1971.

(SEAL)
Attest:

EDWARD M. FLETCHER, JR.
Attesting Officer

ROBERT GOTTSCHALK
Acting Commissioner of Patents